United States Patent [19]

Bray et al.

[11] 4,279,875

[45] Jul. 21, 1981

[54] METHOD OF RELEASING FISSION GASES FROM IRRADIATED FUEL

[75] Inventors: Lane A. Bray, Richland; Allyn L. Boldt, Kennewick, both of Wash.

[73] Assignee: Exxon Nuclear Company, Inc., Bellevue, Wash.

[21] Appl. No.: 951,266

[22] Filed: Oct. 13, 1978

Related U.S. Application Data

[63] Continuation of Ser. No. 766,142, Feb. 7, 1977, abandoned.

[51] Int. Cl.$^3$ .............................................. G21F 9/30
[52] U.S. Cl. ............................ 423/249; 252/301.1 W; 423/648 A

[58] Field of Search .................. 423/3, 249, 251, 260, 423/648 A, 580, 19; 252/301.1 R, 301.1 W

[56] References Cited

PUBLICATIONS

U.S. Atomic Energy Report ORNL-TM-3624, (Dec. 1971), pp. 17-20.

Primary Examiner—Deborah L. Kyle
Attorney, Agent, or Firm—M. L. Williams; R. D. Hantman

[57] ABSTRACT

The process for oxidizing irradiated fuel pellets using as the oxidant $NO_2$ or a mixture of $NO_2$ with its dissociation products, $O_2$ and NO, in order to release the Volatile Fission Products (iodine, zenon, krypton and tritium) from the pellets.

17 Claims, 3 Drawing Figures

METHOD OF RELEASING FISSION GASES FROM IRRADIATED FUEL

This is a continuation of application Ser. No. 766,142, filed Feb. 7, 1977 now abandoned.

BACKGROUND OF THE INVENTION

This invention relates to a process for releasing volatile fission products from irradiated fuel pellets with either $NO_2$ or a mixture of $NO_2$ with its dissociation products, $O_2$ and NO.

One of the problems encountered in the reprocessing of irradiated nuclear fuel is the extreme difficulty in separating the volatile fission products from the reaction solutions of the reprocessing process. This is especially important with regard to removing tritium in that the tritium isotope is extremely difficult to separate from aqueous solutions. The hydrogen isotope tritium, has a half life of about 12.26 years and is a ternary fission product produced in small mass quantities, approximately 1/1000 of an oz. in each ton of fuel. However, because of the volume of irradiated fuel anticipated to be produced in order to satisfy the world's electrical needs for the year 2000, there would be significant volumes of tritium produced. Recovery of tritium in nuclear fuel reprocessing plants of conventional designs is not practical because of the very small amounts of tritium in each ton of fuel. Tritium, in the form of tritiated water, becomes intimately mixed with the thousands of gallons of process water in the plant, Isotopic separation of the tritium from this large volume of water would be required before the water could be released as liquid or vapor. Since the isotopic separation of tritium in such volumes of water is not practical, it is necessary to develop a technique for the removal of volatile fission products from irradiated fuel prior to aqueous reprocessing.

The problem of removing volatile fission products from irradiated fuel is encountered when reprocessing irradiated uranium dioxide fuel and/or irradiated mixed oxides, i.e., $UO_2$ and $PuO_2$. The problem of removing the volatile fission products is increased by the fact that volatile fission products are trapped within the crystal lattice of the irradiated fuel and thus cannot be removed by grinding or pulverizing the fuel.

A process for the removal of volatile fission products from irradiated fuel has been developed by the Oak Ridge National Laboratories and is referred to as voloxidation and is described in the Oak Ridge National Laboratories Report ORNL-TM-3723. Voloxidation is a process for oxidizing irradiated fuel in the presence of oxygen at a controlled temperature in order to form a very fine powder of $U_3O_8$. The voloxidation process is sensitive to temperature. It has been estimated that in a large commercial plant the reaction temperature would have to be maintained at a narrow range probably at about 480° C. plus or minus 10° C. Because of the narrow temperature range, the difficulty in operating large scale reprocessing plants would be increased. Therefore a method for releasing the volatile fission product from irradiated fuel in a commercially reasonable time and under commercially reasonable processing conditions would be desirable and could result in major process economies in reduction of costs for the reprocessing of nuclear fuels. The present invention is such a method.

SUMMARY OF THE INVENTION

The present invention, broadly, is a process for oxidizing irradiated nuclear fuels in order to release the volatile fission products, i.e., iodine, xenon, krypton and tritium. Irradiated uranium dioxide or mixed oxide fuels are oxidized with nitrogen dioxide gas. Nitrogen dioxide, at the reaction temperature of this process, is in equilibrium with its dissociation products, nitrogen monoxide and oxygen. Thus the oxidant may be added as nitrogen dioxide, the dissociation products of nitrogen dioxide (nitrogen monoxide and oxygen) or as a mixture of nitrogen dioxide and its dissociation products. The oxidant may be diluted with a gas, such as nitrogen or nitrogen monoxide without any substantial deleterious effect. The oxidation reaction temperature may be from about 325° C. to 800° C., preferably between about 350° C. and 780° C. More preferably, the reaction is maintained at about 350° to 650° C.

The reaction is maintained for a time sufficient to convert the fuel pellets to a fine powder having a mean particle size of less than 0.105 millimeters and preferably less than 0.045 millimeters. Heating to reaction temperatures above 800° C. will result in an aglomeration of the fine powder and thus is to be avoided.

The irradiated fuel assemblies after removal from the reactor are generally permitted to cool and then the fuel rods are cut open or chopped-up in order to prepare the irradiated fuel for reprocessing. The irradiated nuclear fuel is then placed in a reactor vessel and nitrogen dioxide alone or in admixture with its dissociation products is passed through the reactor. The system is heated to a reaction temperature between 325° and 800° C. During the oxidation reaction the fission gases, particularly tritium, in nearly quantitative amounts, are released to the off-gas system. During the reaction $UO_2$ is oxidized to form $UO_3$ and/or $U_3O_8$.

DESCRIPTION OF THE PREFERRED EMBODIMENT

Figure 1:
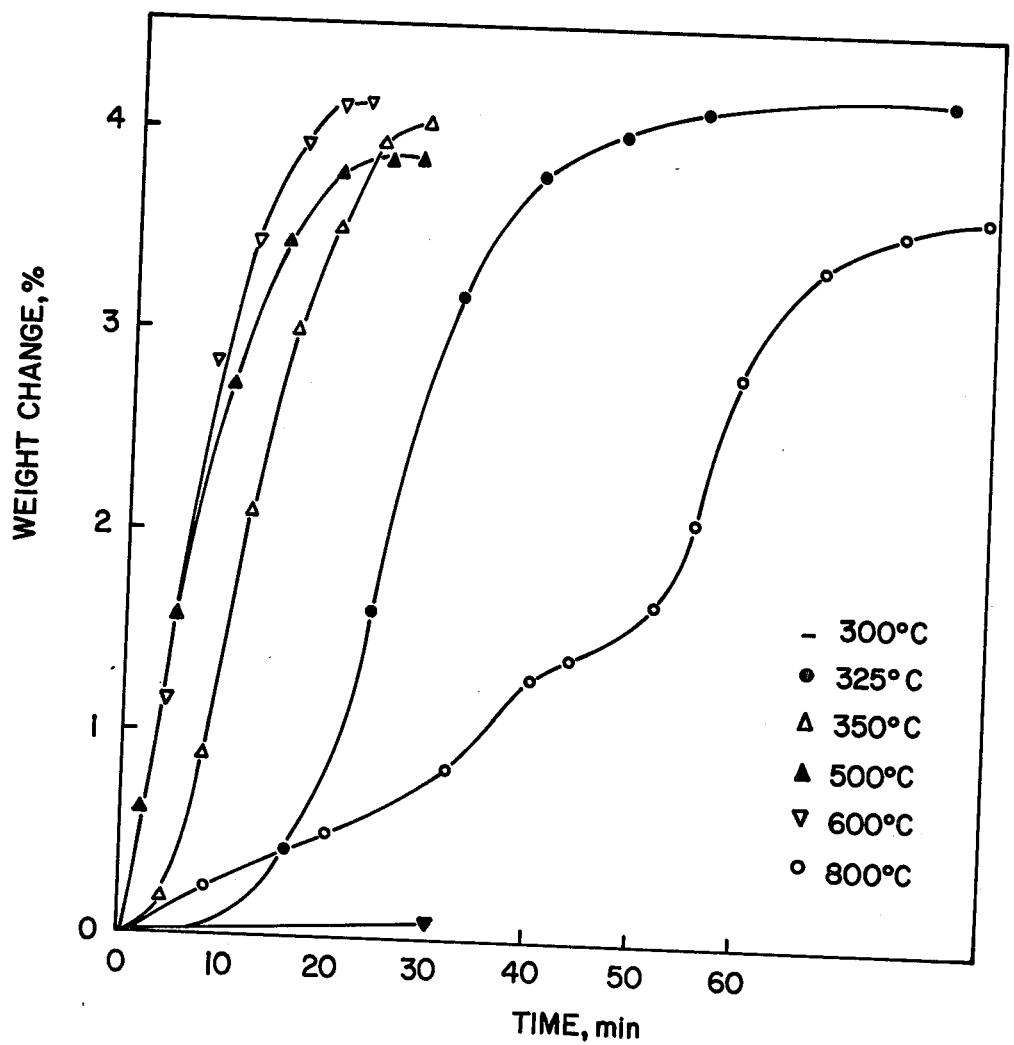

In accordance with this invention an irradiated nuclear fuel, i.e., $UO_2$ or a mixture of $UO_2$ and $PuO_2$, may be placed in the reactor vessel and oxidized with a nitrogen oxide gas, for example, nitrogen dioxide or a mixture of nitrogen and its dissociation products, oxygen and nitrogen monoxide. The oxidation is carried out by placing the irradiated fuel in the reactor vessel, heating to a reaction temperature of about 350° to 780° C. in the presence of nitrogen dioxide. The irradiated fuel is heated for a time sufficient to reduce the irradiated fuel to a fine powder ($U_3O_8$ and $UO_3$). The time of the reaction will vary depending upon the volume of material in the reactor, fuel chop size, $UO_2$ particle size, temperature, and gas composition. The fine powder will have a mean particle diameter of less than 0.105 millimeters and preferably a mean particle diameter of less than 0.045 millimeters.

The released tritium may be collected as tritium gas or it may be oxidized to form THO, cooled and collected as a liquid ($TNO_3$, HTO etc.).

In order to demonstrate the effectiveness of this invention, fuel pellets were oxidized in ordinary laboratory equipment. Fuel pellets were placed in a sample boat and inserted into a combustion tube. A thermocouple was used for temperature control. A tube furnace was placed around the combustion tube to provide heat to the system. The oxidant was passed through the combustion tube as a gas. Tritium liberated during the oxidation was converted to THO in a copper oxide furnace and condensed in a cold finger.

EXAMPLE 1

One gram samples of an irradiated uranium oxide ($UO_2$) fuel and a mixed oxide ($UO_2/PuO_2$) fuel were each oxidized for four hours with $NO_2$ at 400° C. At the end of the four hour period the irradiated fuel was in the form of a very fine powder. The resulting powder was dissolved in 15 milliliters of 8 molar $HNO_3$ for between three and four hours at 100° C., filtered and sampled for tritium remaining in solution. An additional one gram sample of each of the irradiated fuels, without $NO_2$ oxidation, was dissolved directly in 8 molar $HNO_3$ for about four hours at 100° C., filtered and sampled for tritium to provide a standard sample. The residual filtered solids for both the standard and test samples were further dissolved with 8 molar $HNO_3$ plus 0.005 molar hydrofluoric acid, and the resulting solution sampled to determine the tritium content of the solids. The results of the oxidation of the two fuel samples are set forth in Table I below:

TABLE I

| Fuel | Tritium Found, $\mu ci/g\ UO_2$ Dissolver Solution | Solids | Percent Tritium as compared to Standard |
|---|---|---|---|
| Standard $UO_2$ | 159.0 | 0.05 | — |
| $NO_2$ oxidized $UO_2$ | 0.17 | 0.12 | 0.2% |
| Standard $UO_2/PuO_2$ | 20.4 | 0.11 | — |
| $NO_2$ oxidized $UO_2/PuO_2$ | 0.64 | 0.4 | 5% |

It is to be seen from the above results that the $NO_2$ oxidation of the fuel prior to dissolution effectively removed the tritium from the fuel. The mixed oxide dissolver solution and solids contained 5% of the initial tritium content.

EXAMPLE 2

A series of runs were made under isothermal conditions at temperatures of 300° C. to 800° C. using samples of $UO_2$ fuel pellets to determine the rate of the reaction. When the oxidation was complete the fuel pellet was converted to a finely divided powder and the fuel sample showed a weight gain of 4 weight percent. The results of these runs are plotted in FIG. 1. For runs at temperatures of 325° C. to 600° C. the final product was a powder. Runs made at 350°, 500° and 600° appear to be approximately equivalent.

EXAMPLE 3

Figure 2:
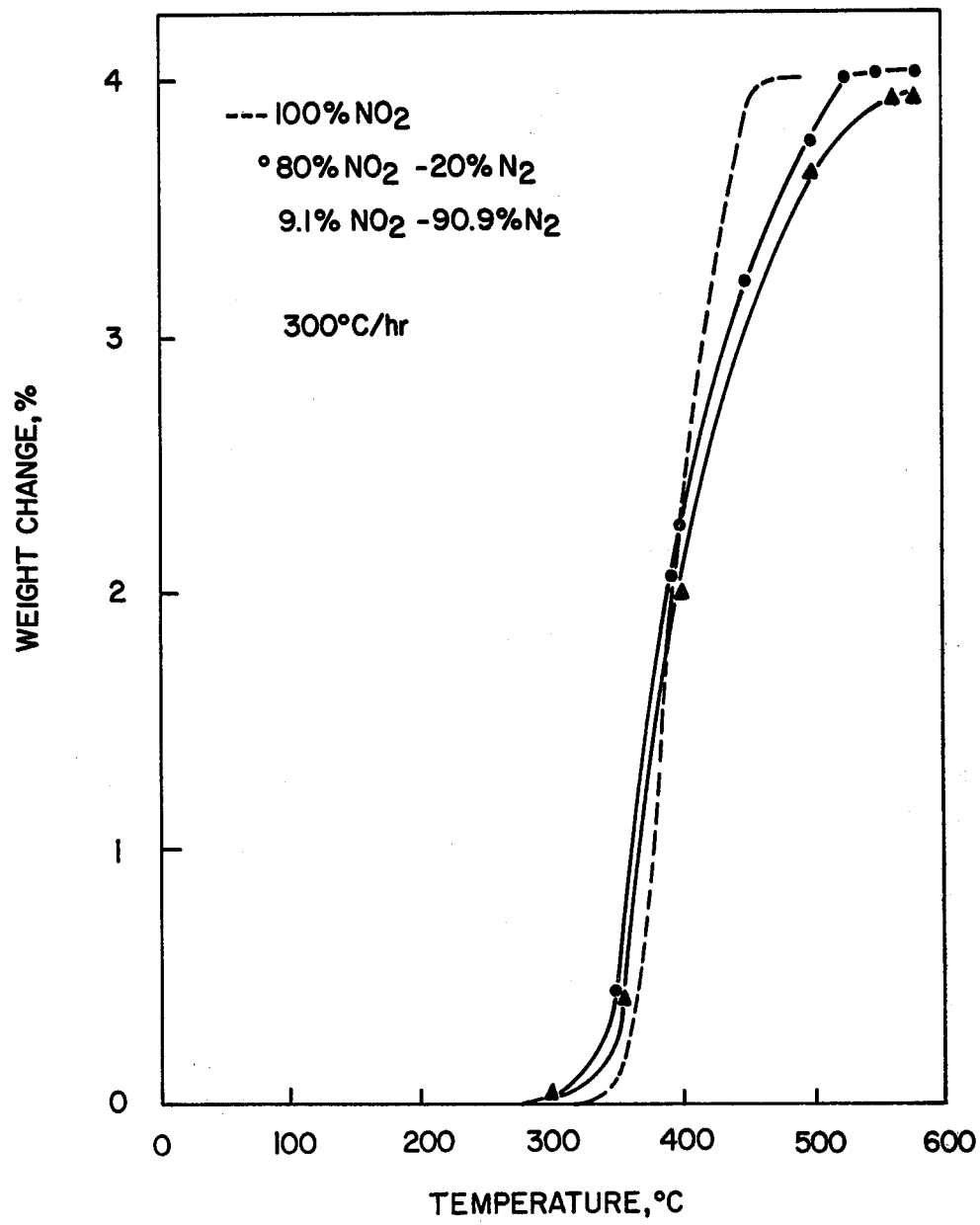

A series of constant rates of heating experiments were made to test the effect of diluting the oxidant $NO_2$, with nitrogen with the results plotted in FIG. 2. The fuel samples were $UO_2$ pellets. It is to be noted that the rate of reaction for $UO_2$ oxidation in $NO_2$ is relatively insensitive to $N_2$ dilution.

EXAMPLE 4

Figure 3:
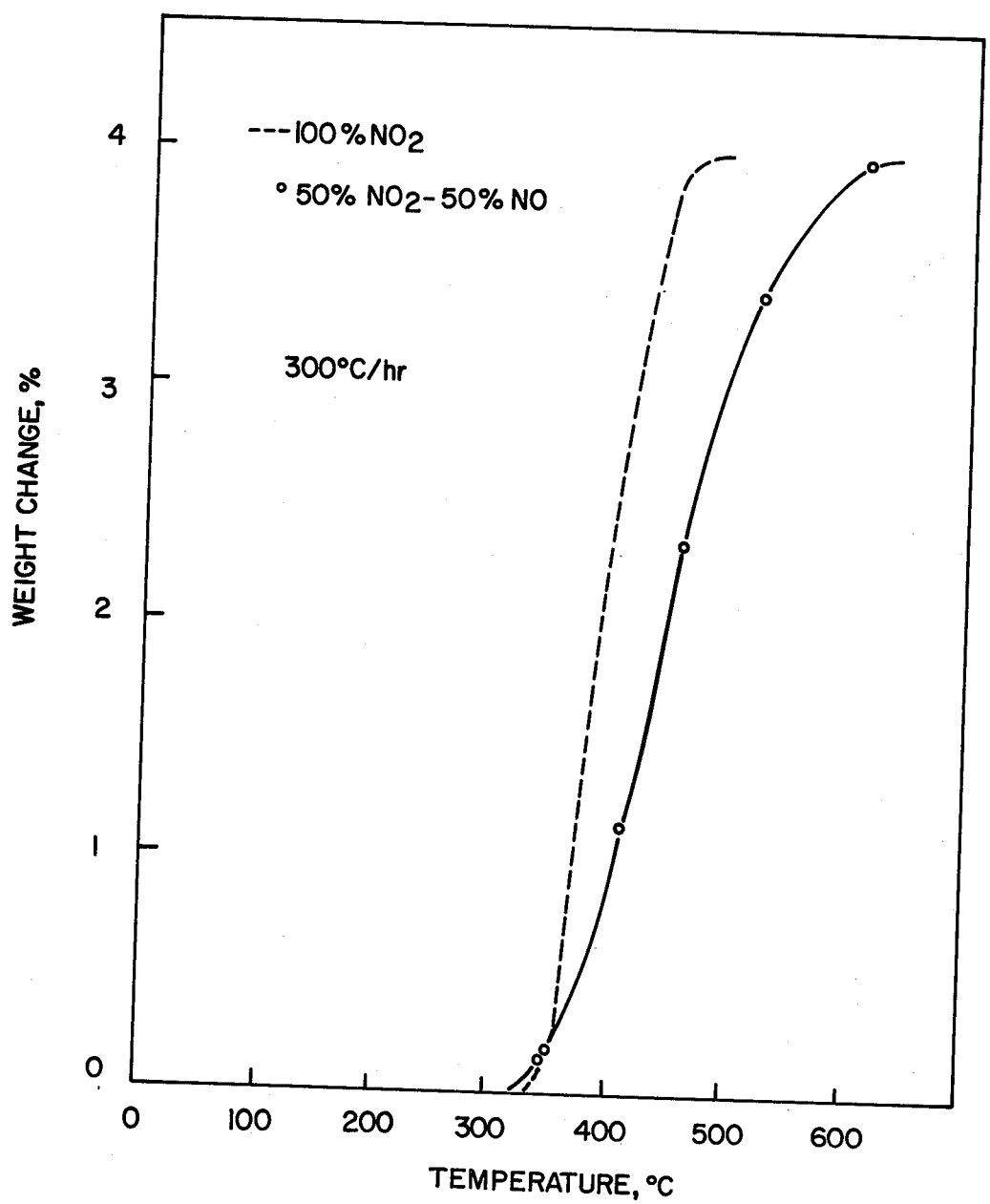

To determine the influence of NO dilution on $UO_2$ oxidation, a constant rate of heating experiment was made with $NO_2$ and NO added as the oxidant mixture with the results plotted in FIG. 3. The oxidant used was a 50/50 mixture of $NO_2$ and NO. It is observed that increased amounts of NO tend to reduce the rate of reaction for $UO_2$ oxidation in $NO_2$.

While a preferred embodiment of the present invention has been described heretofore together with certain modification, various other modifications will be obvious to those skilled in the art once they have been made aware of the present disclosure. Accordingly, reference should be made to the following appended claims to determine the true scope and spirit of this invention.

We claim:

1. A process for releasing tritium from irradiated fuel which comprises reacting an irradiated nuclear fuel pellet with an oxidizing gas consisting essentially of nitrogen oxide constant at a reaction temperature between about 325° and 800° C. for a time sufficient to form a fine powder thereby releasing the tritium.

2. A process as a claim 1 wherein the irradiated fuel is selected from the group consisting of uranium oxide, plutonium oxide and mixtures thereof.

3. A process as in claim 1 wherein the reaction temperature is maintained between about 350° and 650° C.

4. A process as in claim 1 wherein the oxidant is essentially nitrogen dioxide.

5. A process as in claim 1 wherein the oxidant consists essentially of a mixture of nitrogen dioxide, oxygen and nitrogen monoxide.

6. A process as in claim 1 wherein the oxidant is diluted with a gas.

7. A process as in claim 7 wherein the diluent gas is nitrogen.

8. A process as in claim 7 wherein the diluent gas is nitrogen monoxide.

9. A process for releasing tritium from irradiated fuel which comprises oxidizing an irradiated fuel selected from the group consisting of uranium oxide and a mixed oxide comprising uranium oxide and plutonium oxide with an oxidizing gas consisting essentially of nitrogen dioxide at a reaction temperature of between about 350° and about 650° C.

10. A process as in claim 9 wherein the nitrogen dioxide is in equilibrium with its dissociation products, oxygen and nitrogen monoxide.

11. A process for releasing tritium produced during the irradiation of nuclear fuel, which comprises oxidizing an irradiated nuclear fuel selected from the group consisting of uranium oxide, plutonium oxide and mixtures thereof with an oxidizing gas consisting essentially of an oxidant selected from the group consisting of nitrogen dioxide, nitrogen dioxide dissociation products, and mixtures of nitrogen dioxide and its dissociation products at a reaction temperature between 325° C. and 800° C. thereby modifying the crystalline structure of the fuel and releasing said tritium.

12. A process as in claim 11 wherein the reaction temperature is between 350° and 650° C.

13. A process as in claim 11 wherein the oxidant is diluted with a gas.

14. A process as in claim 13 wherein the diluent gas is nitrogen.

15. A process as in claim 13 wherein the diluent gas is nitrogen monoxide.

16. A process for releasing the tritium produced during the irradiation of nuclear fuel which comprises oxidizing an irradiated nuclear fuel with an oxidizing gas consisting essentially of an oxidant selected from the group consisting of nitrogen dioxide, the dissociation products of nitrogen dioxide, and a mixture of nitrogen dioxide and its dissociation products at a reaction temperature of 350° C. to 650° C. thereby oxidizing the fuel to a fine powder and releasing the said tritium.

17. A process as in claim 16 wherein the fuel is oxidized at a reaction temperature of 450° C.

* * * * *